US012599540B2

(12) United States Patent
Bryant

(10) Patent No.: US 12,599,540 B2
(45) Date of Patent: Apr. 14, 2026

(54) PRESSURE PAD HEADGEAR DEVICE

(71) Applicant: Kyle Bryant, Kennewick, WA (US)

(72) Inventor: Kyle Bryant, Kennewick, WA (US)

( * ) Notice: Subject to any disclaimer, the term of this patent is extended or adjusted under 35 U.S.C. 154(b) by 48 days.

(21) Appl. No.: 18/648,636

(22) Filed: Apr. 29, 2024

(65) Prior Publication Data

US 2025/0281354 A1 Sep. 11, 2025

Related U.S. Application Data

(60) Provisional application No. 63/563,584, filed on Mar. 11, 2024.

(51) Int. Cl.
*A61H 39/04* (2006.01)

(52) U.S. Cl.
CPC ..... *A61H 39/04* (2013.01); *A61H 2201/0192* (2013.01); *A61H 2201/1607* (2013.01); *A61H 2201/165* (2013.01); *A61H 2201/168* (2013.01); *A61H 2205/021* (2013.01); *A61H 2205/025* (2013.01); *A61H 2205/028* (2013.01); *A61H 2205/04* (2013.01)

(58) Field of Classification Search
CPC ...... A61H 39/00; A61H 39/007; A61H 39/02; A61H 39/04; A61H 2205/028
See application file for complete search history.

(56) References Cited

U.S. PATENT DOCUMENTS

| | | | |
|---|---|---|---|
| 3,159,160 A | 12/1964 | Ullom | |
| 5,792,174 A | 8/1998 | Ioan | |
| 6,182,313 B1 | 2/2001 | Eschenbach | |
| 7,153,283 B1 | 12/2006 | Triolo | |
| 2005/0267388 A1 | 12/2005 | Hanna | |
| 2017/0209328 A1* | 7/2017 | Kajimoto | A61H 1/006 |
| 2023/0062659 A1* | 3/2023 | Hsu | A61M 21/00 |

* cited by examiner

*Primary Examiner* — Todd J Scherbel
(74) *Attorney, Agent, or Firm* — Brennan, Manna & Diamond, LLC

(57) ABSTRACT

A pressure pad headgear device is provided. The device is designed to apply pressure to specific points on a user's head, face, and neck for relief similar to pressure point therapy adjustments. The device is made from a plurality of straps that can adjust in tightness via fasteners such as buckles, hook and loop, or snap buttons. Each strap can be further connected to other straps through hinge points, allowing for adjustments in device tightness. Each strap is comprised of at least one adjustable and repositionable pressure pad with openings to accommodate the straps, ensuring the pads can be positioned precisely over designated pressure points. These pads are secured and adjusted against the target areas of a user's head, face, and/or neck using fasteners to perform pressure point therapy.

8 Claims, 5 Drawing Sheets

PRESSURE PAD HEADGEAR DEVICE

CROSS-REFERENCE TO RELATED APPLICATION

The present application claims priority to, and the benefit of, U.S. Provisional Application No. 63/563,584, which was filed on Mar. 11, 2024, and is incorporated herein by reference in its entirety.

FIELD OF THE INVENTION

The present invention relates generally to the field of pressure point therapy. More specifically, the present invention relates to a pressure pad headgear device with a plurality of straps, wherein each strap may be comprised of a repositionable and adjustable pressure pad that provides pressure against a pressure point of a user's head, face, and/or neck. Accordingly, the present disclosure makes specific reference thereto. Nonetheless, it is to be appreciated that aspects of the present invention are also equally applicable to other like applications, devices, and methods of manufacture.

BACKGROUND

Individuals who suffer from chronic migraines, tension headaches, and cluster headaches, face a daily battle not just with pain but also with the resultant irritability and discomfort that permeates their everyday existence. For a significant number of sufferers, these conditions go beyond mere inconvenience; they evolve into crippling impediments that limit functionality and quality of life. The ripple effects of such headaches are profound, often leading to a cascade of secondary health issues. Insomnia, for instance, becomes a common companion to those beleaguered by the incessant throbbing, as the ability to achieve restorative sleep eludes them. This lack of sleep can, in turn, trigger or exacerbate depression, a condition that further erodes one's sense of well-being and ability to cope with pain.

Moreover, the diminished appetite that frequently accompanies severe headache episodes can lead to nutritional deficiencies, weakening the body's overall health and resilience. The exhaustion that stems from living in a state of chronic pain is another grave consequence, sapping energy and vitality and leaving individuals feeling perpetually fatigued. This fatigue, coupled with the ongoing struggle against pain, can ensnare people in a vicious cycle of dependence on prescription pain relievers. These medications, while offering temporary respite, come with their own set of complications, including a wide range of problematic side effects that can affect mental clarity, digestive health, and more. Furthermore, the risk of developing an addiction to these substances is a significant concern, posing a dire threat to the individual's health and well-being.

In the quest for relief, some individuals turn to treatments such as pressure point therapy. This approach targets specific points on the body, applying pressure or manipulation to alleviate the pain and discomfort associated with headaches. While many have found relief in such treatments, they are not without their challenges as access to quality chiropractic care can be limited by factors such as time, availability, and financial constraints. For those who cannot readily access or afford these services, the promise of relief remains out of reach, further exacerbating the sense of helplessness and frustration that often accompanies chronic headache conditions.

Therefore, there exists a long-felt need in the art for a headache treatment device. There also exists a long-felt need in the art for a pressure pad headgear device. More specifically, there exists a long-felt need in the art for a pressure pad headgear device that simulates pressure point therapy to treat headaches. In addition, there exists a long-felt need in the art for a pressure pad headgear device that simulates pressure point therapy to treat headaches wherein the device can be used by an individual without having to go to a chiropractor or other medical provider.

The subject matter disclosed and claimed herein, in one embodiment thereof, comprises a pressure pad headgear device. The device is designed to apply pressure to specific points on a user's head, face, and neck for relief similar to pressure point therapy adjustments. The device is made from a plurality of straps that can adjust in tightness via fasteners such as buckles, hook and loop, or snap buttons. Each strap can be further connected to other straps through hinge points, allowing for adjustments in device tightness. Each strap is comprised of at least one adjustable and repositionable pressure pad with openings to accommodate the straps, ensuring the pads can be positioned precisely over designated pressure points. These pads are secured and adjusted against the target areas of a user's head, face, and/or neck using fasteners to perform pressure point therapy.

In this manner, the pressure pad headgear device of the present invention accomplishes all the foregoing objectives and provides a headache treatment device. More specifically, the device simulates pressure point therapy to treat headaches. While doing so, the device does not require that a user go to a chiropractor or other medical provider.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a pressure pad headgear device comprised of at least one (but preferably three) strap(s) comprised of at least one adjustable and repositionable pressure pad. The pressure pad can be repositioned along the strap such that it provides pressure onto a pressure point area on a user's head.

The straps may be made from any material. In another embodiment, the length/tightness of the strap can be adjusted via at least one adjustment fastener. In a further embodiment, the strap may be made of a metal material and may be repositionable and attached to another strap via at least one hinge point that allows for the device to increase or decrease in tightness around a user's head, face, and/or neck. In an embodiment wherein the device has three straps, the first strap surrounds a user's head circumferentially. The second strap runs along the top of a user's head. Finally, a third strap runs along the back of a user's head and/or neck.

The straps may be comprised of at least one pressure pad. The pressure pad is comprised of at least one opening that allows the strap to pass through the pad such that the pad is captured on the strap. Further, the pad can be repositioned along the strap as needed in order to be placed over a specific pressure point area of a user's head, face, and/or neck. Once positioned in said area, at least one fastener of the pad can be turned a first direction in order to tighten the pad against the user's head, face, and/or neck area in order to provide pressure relief on a pressure point area similar to a chiropractic treatment.

The present invention is also comprised of a method of using the device. First, a device is provided comprised of a first strap that may be comprised of at least one pressure pad, a second strap that may be comprised of at least one pressure pad, and a third strap that may be comprised of at least one pressure pad. Then, the first strap can be positioned circumferentially around a user's head, wherein the tightness of the strap can be adjusted as necessary via at least one adjustment fastener. Next, the second strap can be positioned along the top of a user's head, wherein the tightness of the strap can be adjusted as necessary via at least one adjustment fastener. Further, the third strap can be positioned along the back of a user's head and neck, wherein the tightness of the strap can be adjusted as necessary via at least one adjustment fastener. Next, the pressure pads of the straps can be positioned along each strap such that it contacts a pressure point area of the user's head, neck, and/or face. Finally, each pressure pad can be tightened against (i.e., provide compressive pressure onto) each pressure point area of the user's head, neck, and/or face using at least one fastener of each pad to provide pressure point therapy.

Accordingly, the pressure pad headgear device of the present invention is particularly advantageous as it provides a headache treatment device. More specifically, the device simulates pressure point therapy to treat headaches. While doing so, the device does not require that a user go to a chiropractor or other medical provider. In this manner, the pressure pad headgear device overcomes the limitations of existing practices used for pressure point therapy known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
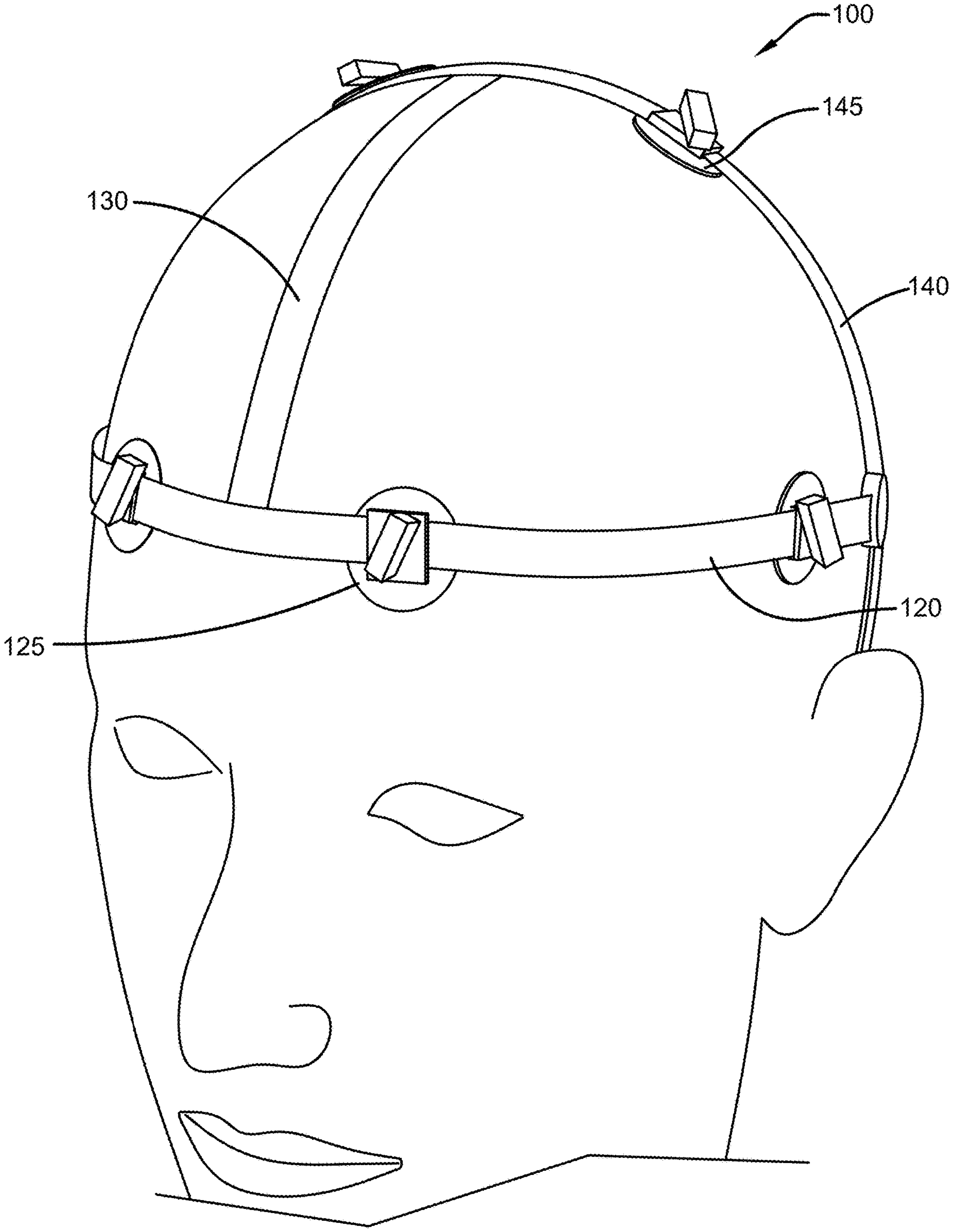
FIG. 1 illustrates a front perspective view of one potential embodiment of a pressure pad headgear device of the present invention while worn on a user's head in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a headache treatment device. There also exists a long-felt need in the art for a pressure pad headgear device. More specifically, there exists a long-felt need in the art for a pressure pad headgear device that simulates pressure point therapy to treat headaches. In addition, there exists a long-felt need in the art for a pressure pad headgear device that simulates pressure point therapy to treat headaches wherein the device can be used by an individual without having to go to a chiropractor or other medical provider.

The present invention, in one exemplary embodiment, is comprised of a pressure pad headgear device comprised of at least one (but preferably three) strap(s) comprised of at least one adjustable and repositionable pressure pad. The pressure pad can be repositioned along the strap such that it provides pressure onto a pressure point area on a user's head.

The straps may be made from any material, wherein the length/tightness of the strap can be adjusted via at least one adjustment fastener. In a further embodiment, the strap may be made of a metal material and may be repositionable and attached to another strap via at least one hinge point that allows for the device to increase or decrease in tightness around a user's head, face, and/or neck. In an embodiment wherein the device has three straps, the first strap surrounds a user's head circumferentially. The second strap runs along the top of a user's head. Finally, a third strap runs along the back of a user's head and/or neck.

The straps may be comprised of at least one pressure pad. The pressure pad is comprised of at least one opening that allows the strap to pass through the pad such that the pad is captured on the strap. Further, the pad can be repositioned along the strap as needed in order to be placed over a specific pressure point area of a user's head, face, and/or neck. Once positioned in said area, at least one fastener of the pad can be turned a first direction in order to tighten the pad against the user's head, face, and/or neck area in order to provide pressure relief on a pressure point area similar to a chiropractic treatment.

The present invention is also comprised of a method of using the device. First, a device is provided comprised of a first strap that may be comprised of at least one pressure pad, a second strap that may be comprised of at least one pressure pad, and a third strap that may be comprised of at least one pressure pad. Then, the first strap can be positioned circumferentially around a user's head, wherein the tightness of the strap can be adjusted as necessary via at least one adjustment fastener. Next, the second strap can be positioned along the top of a user's head, wherein the tightness of the strap can be adjusted as necessary via at least one adjustment fastener. Further, the third strap can be positioned along the back of a user's head and neck, wherein the tightness of the strap can be adjusted as necessary via at least one adjustment fastener. Next, the pressure pads of the straps can be positioned along each strap such that it contacts a pressure point area of the user's head, neck, and/or face. Finally, each pressure pad can be tightened against (i.e., provide compressive pressure onto) each pressure point area of the user's head, neck, and/or face using at least one fastener of each pad to provide pressure point therapy.

Accordingly, the pressure pad headgear device of the present invention is particularly advantageous as it provides a headache treatment device. More specifically, the device simulates pressure point therapy to treat headaches. While doing so, the device does not require that a user go to a chiropractor or other medical provider. In this manner, the pressure pad headgear device overcomes the limitations of existing practices used for pressure point therapy known in the art.

Referring initially to the drawings, FIG. 1 illustrates a front perspective view of one potential embodiment of a pressure pad headgear device 100 of the present invention while worn on a user's head in accordance with the disclosed architecture. The device 100 is comprised of at least one (but preferably three) strap(s) 120 comprised of at least one adjustable and repositionable pressure pad 125. The pressure pad 125 can be repositioned along the strap 120 such that it provides pressure onto a pressure point area on a user's head.

Figure 2:
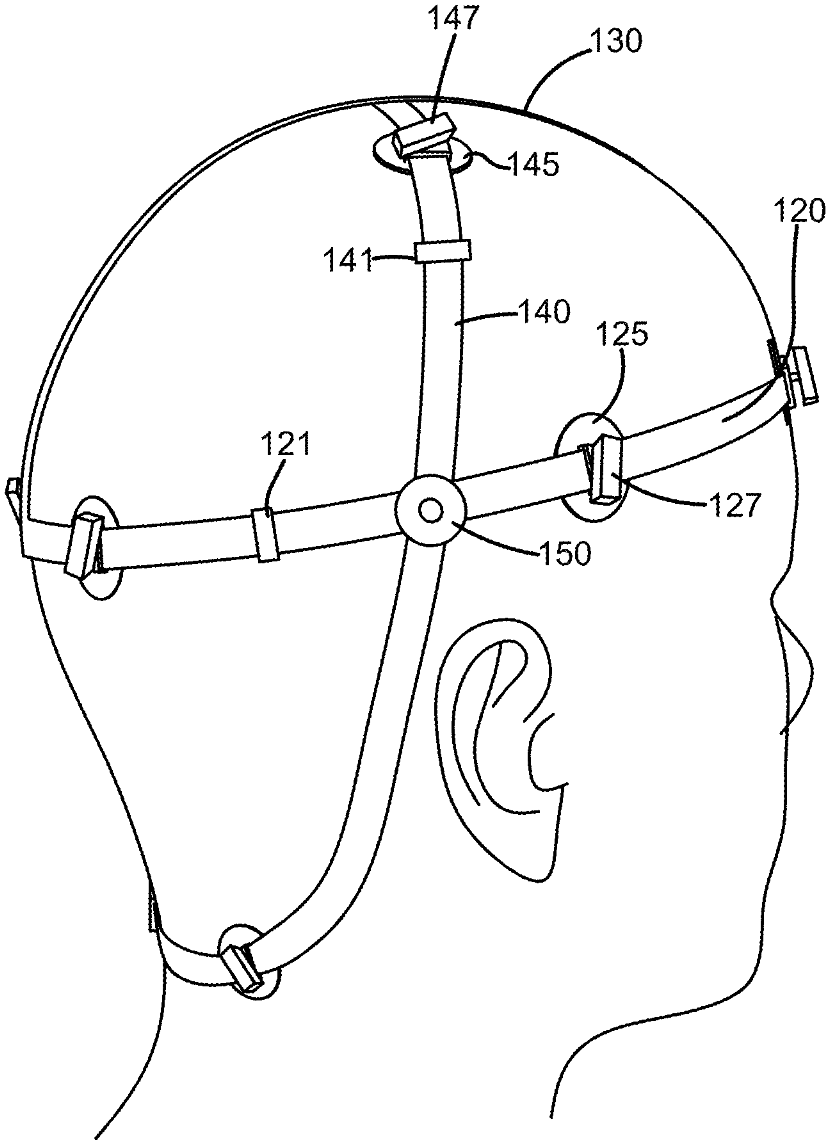
FIG. 2 illustrates a rear perspective view of one potential embodiment of a pressure pad headgear device of the present invention while worn on a user's head in accordance with the disclosed architecture.

The strap 120 may be made from any material known in the art such as a fabric material, a metal material, or some combination thereof. The strap 120 may be made from an elastic material that may stretch. In another embodiment, the strap 120 is made from a material that is not stretchable, wherein the length/tightness of the strap 120 can be adjusted via at least one adjustment fastener 121 such as, but not limited to, a sliding buckle, hook and loop, snap button, etc. In a further embodiment, the strap 120 may be made of a metal material and may be repositionable and attached to another strap 130, 140 via at least one hinge point 150, as seen in FIG. 2, that allows for the device 100 to increase or decrease in tightness around a user's head, face, and/or neck. In an embodiment wherein the device 100 has three straps 120, 130, 140, the first strap 120 surrounds a user's head circumferentially.

The strap 120 may be comprised of at least one pressure pad 125 may be any size and shape and may be made from any material. The pressure pad 125 is comprised of at least one opening 126. The opening 126 allows the strap 120 to pass through the pad 125 such that the pad 125 is captured on the strap 120. Further, the pad 125 can be repositioned along the strap 120 as needed in order to be placed over a specific pressure point area of a user's head, face, and/or neck. Once positioned in said area, at least one fastener 127 such as, but not limited to, a threaded knob of the pad 125 can be turned a first direction in order to tighten the pad 125 against the user's head, face, and/or neck area in order to provide pressure relief on a pressure point area similar to a chiropractic treatment. The pad 125 can then be loosened by turning the fastener 127 in a second direction.

Figure 4:
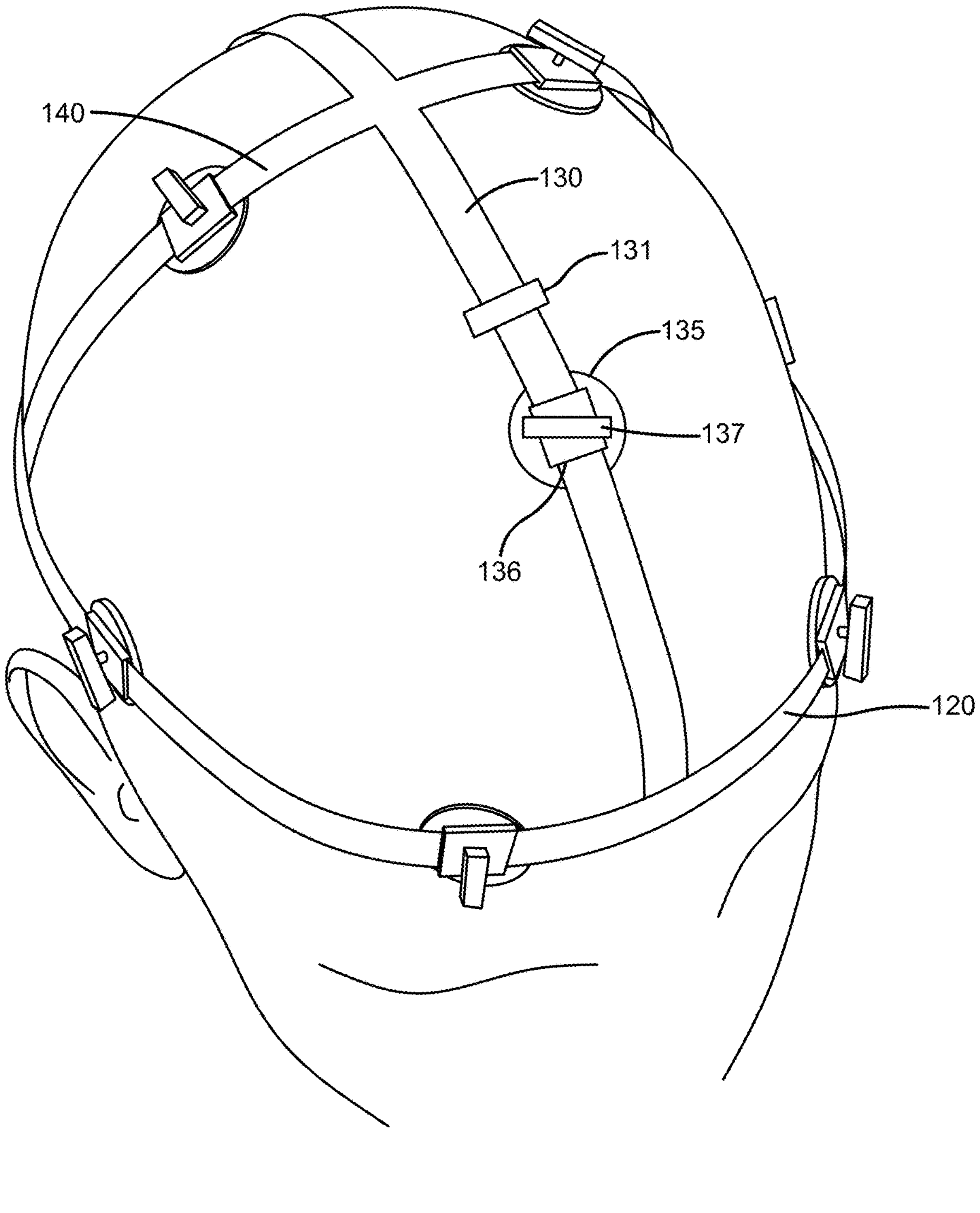
FIG. 4 illustrates a top perspective view of one potential embodiment of a pressure pad headgear device of the present invention while worn on a user's head in accordance with the disclosed architecture.

The strap 130 may be made from any material known in the art such as a fabric material, a metal material, or some combination thereof. The strap 130 may be made from an elastic material that may stretch. In another embodiment, the strap 130 is made from a material that is not stretchable, wherein the length/tightness of the strap 130 can be adjusted via at least one adjustment fastener 131 such as, but not limited to, a sliding buckle, hook and loop, snap button, etc. In a further embodiment, the strap 130 may be made of a metal material and may be repositionable attached to another strap 120, 140 via at least one hinge point 150 that allows for the device 100 to increase or decrease in tightness around a user's head, face, and/or neck. In an embodiment wherein the device 100 has three straps 120, 130, 140, the second strap 130 surrounds the top of a user's head, as seen in FIG. 4.

The strap 130 may be comprised of at least one pressure pad 135 may be any size and shape and may be made from any material. The pressure pad 135 is comprised of at least one opening 136. The opening 136 allows the strap 130 to pass through the pad 135 such that the pad 135 is captured on the strap 130. Further, the pad 135 can be repositioned along the strap 130 as needed in order to be placed over a specific pressure point area of a user's head, face, and/or neck. Once positioned in said area, at least one fastener 137 such as, but not limited to, a threaded knob of the pad 135 can be turned a first direction in order to tighten the pad 135 against the user's head, face, and/or neck area in order to provide pressure relief on a pressure point area similar to a chiropractic treatment. The pad 135 can then be loosened by turning the fastener 137 in a second direction.

Figure 3:
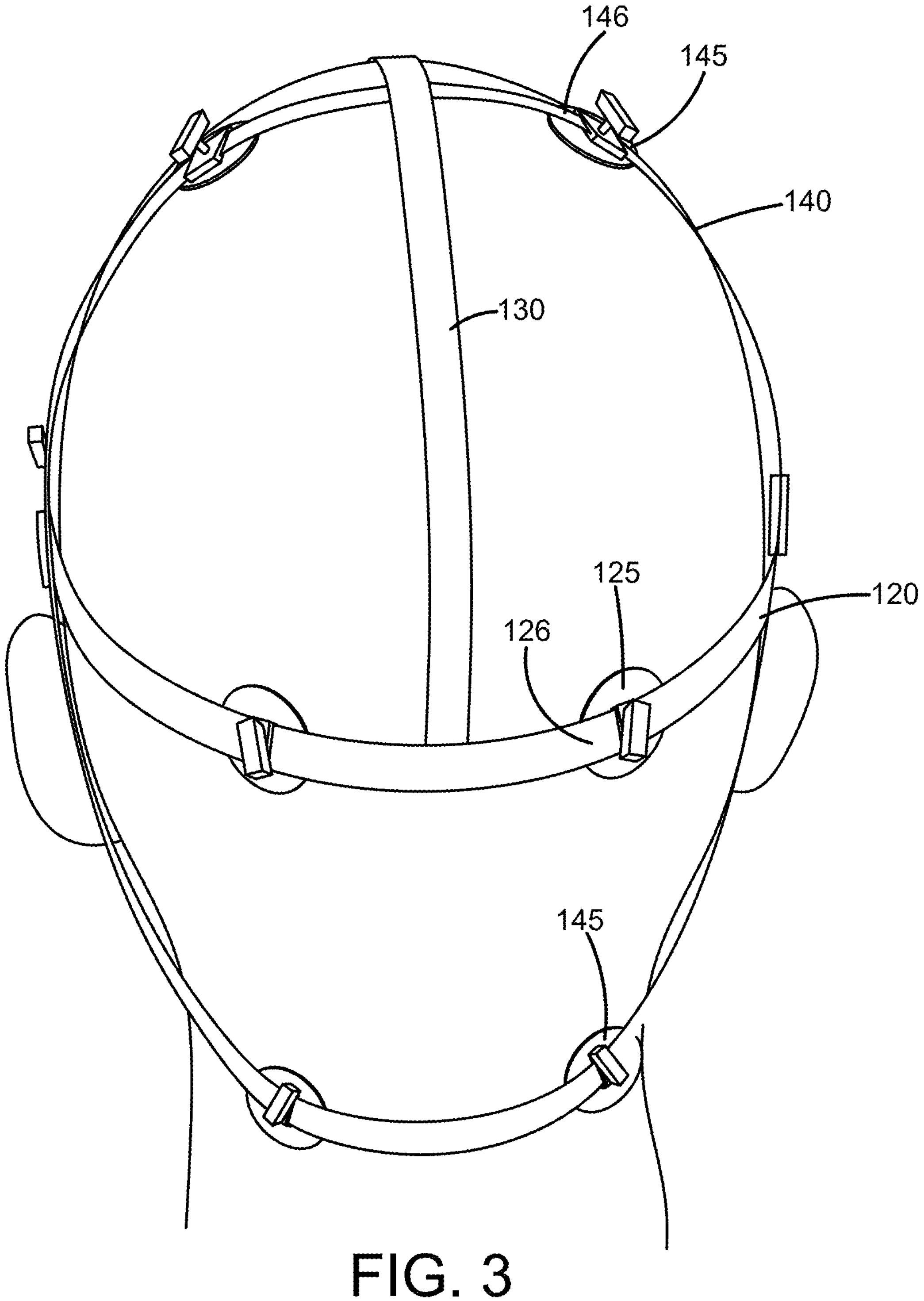
FIG. 3 illustrates a rear perspective view of one potential embodiment of a pressure pad headgear device of the present invention while worn on a user's head in accordance with the disclosed architecture.

The strap 140 may be made from any material known in the art such as a fabric material, a metal material, or some combination thereof. The strap 140 may be made from an elastic material that may stretch. In another embodiment, the strap 140 is made from a material that is not stretchable, wherein the length/tightness of the strap 140 can be adjusted via at least one adjustment fastener 141 such as, but not limited to, a sliding buckle, hook and loop, snap button, etc. In a further embodiment, the strap 140 may be made of a metal material and may be repositionable attached to another strap 120, 130 via at least one hinge point 150 that allows for the device 100 to increase or decrease in tightness around a user's head, face, and/or neck. In an embodiment wherein the device 100 has three straps 120, 130, 140, the third strap 140 surrounds the top of a user's head and a back of a user's neck, as seen in FIG. 3.

The strap 140 may be comprised of at least one pressure pad 145 may be any size and shape and may be made from any material. The pressure pad 145 is comprised of at least one opening 146. The opening 146 allows the strap 140 to pass through the pad 145 such that the pad 145 is captured on the strap 140. Further, the pad 145 can be repositioned along the strap 140 as needed in order to be placed over a specific pressure point area of a user's head, face, and/or neck. Once positioned in said area, at least one fastener 147 such as, but not limited to, a threaded knob of the pad 145 can be turned a first direction in order to tighten the pad 145 against the user's head, face, and/or neck area in order to provide pressure relief on a pressure point area similar to a chiropractic treatment. The pad 145 can then be loosened by turning the fastener 147 in a second direction.

Figure 5:
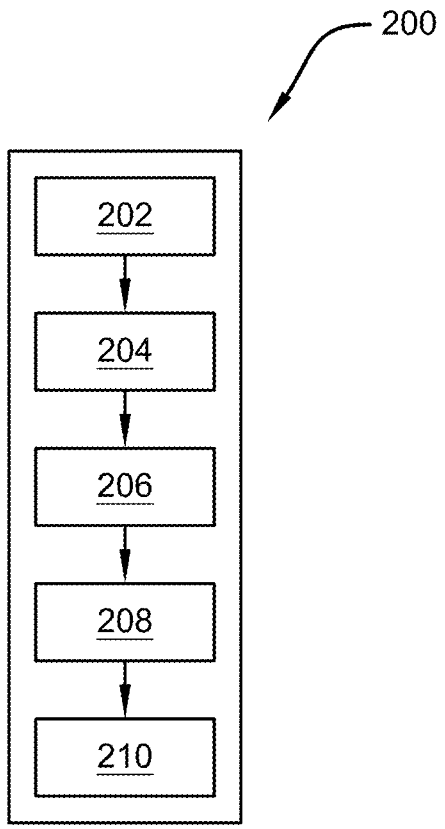
FIG. 5 illustrates a flowchart of a method of using one potential embodiment of a pressure pad headgear device of the present invention in accordance with the disclosed architecture.

The present invention is also comprised of a method of using 200 the device 100, as seen in FIG. 5. First, a device 100 is provided comprised of a first strap 120 that may be comprised of at least one pressure pad 125, a second strap 130 that may be comprised of at least one pressure pad 135, and a third strap 140 that may be comprised of at least one pressure pad 145 [Step 202]. Then, the first strap 120 can be positioned circumferentially around a user's head, wherein the tightness of the strap 120 can be adjusted as necessary via at least one adjustment fastener 121 [Step 204]. Next, the second strap 130 can be positioned along the top of a user's head, wherein the tightness of the strap 130 can be adjusted as necessary via at least one adjustment fastener 131 [Step 204]. Further, the third strap 140 can be positioned along the back of a user's head and neck, wherein the tightness of the strap 140 can be adjusted as necessary via at least one adjustment fastener 141 [Step 206]. Next, the pressure pads 125, 135, 145 of the straps 120, 130, 140 can be positioned along each strap 120, 130, 140 such that it contacts a pressure point area of the user's head, neck, and/or face [Step 208]. Finally, each pressure pad 125, 135, 145 can be tightened against (i.e., provide compressive pressure onto) each pressure point area of the user's head, neck, and/or face using at least one fastener 127, 137, 147 of each pad 125, 135, 145 to provide pressure point therapy [Step 210].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "pressure pad headgear device" and "device" are interchangeable and refer to the pressure pad headgear device 100 of the present invention.

Notwithstanding the foregoing, the pressure pad headgear device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the pressure pad headgear device 100 as shown in the FIGS. are for illustrative purposes only, and that many other sizes and shapes of the pressure pad headgear device 100 are well within the scope of the present disclosure. Although the dimensions of the pressure pad headgear device 100 are important design parameters for user convenience, the pressure pad headgear device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pressure pad headgear device comprising:

a first strap comprised of a first pressure pad comprised of a first opening, a first adjustment fastener, and a first fastener;

a second strap comprised of a second adjustment fastener;

a third strap comprised of a second pressure pad comprised of a second opening, a third adjustment fastener, and a second fastener, wherein the first adjustment fastener, the second adjustment fastener, and the third adjustment fastener are comprised of a hook and loop fastener or a snap button fastener.

2. The pressure pad headgear device of claim 1, wherein the first strap, the second strap, and the third strap are comprised of an elastic material.

3. The pressure pad headgear device of claim 1, wherein the first strap and the second strap are comprised of a metal material.

4. The pressure pad headgear device of claim 3, wherein the first strap and the second strap are connected via a hinge point.

5. The pressure pad headgear device of claim 1, wherein the first fastener is comprised of a threaded knob.

6. The pressure pad headgear device of claim 1, wherein the second fastener is comprised of a threaded knob.

7. The pressure pad headgear device of claim 1, wherein the second strap is comprised of a third pressure pad comprised of a third opening and a third fastener.

8. The pressure pad headgear device of claim 1, wherein the first adjustment fastener, the second adjustment fastener, and the third testament fastener are comprised of a sliding buckle.

* * * * *